US008313636B2

(12) United States Patent
Arnold et al.

(10) Patent No.: US 8,313,636 B2
(45) Date of Patent: Nov. 20, 2012

(54) MACHINING METHOD

(75) Inventors: Jonathan D. Arnold, Ringwood (GB); Raphael Rouillon, Vineuil (FR); Carl Diver, Falcarragh (IE)

(73) Assignee: Delphi Technologies Holding S.arl, Troy, MI (US)

( * ) Notice: Subject to any disclaimer, the term of this patent is extended or adjusted under 35 U.S.C. 154(b) by 1341 days.

(21) Appl. No.: 11/921,540

(22) PCT Filed: Jun. 6, 2006

(86) PCT No.: PCT/GB2006/002102
§ 371 (c)(1),
(2), (4) Date: Dec. 3, 2007

(87) PCT Pub. No.: WO2006/131741
PCT Pub. Date: Dec. 14, 2006

(65) Prior Publication Data
US 2009/0120411 A1 May 14, 2009

(30) Foreign Application Priority Data

Jun. 6, 2005 (EP) .................................... 05253470
Feb. 10, 2006 (GB) .................................. 0602742.9

(51) Int. Cl.
*B23H 3/04* (2006.01)
(52) U.S. Cl. ....................................... 205/661; 205/640
(58) Field of Classification Search .................. 205/640, 205/661
See application file for complete search history.

(56) References Cited

U.S. PATENT DOCUMENTS

| 3,910,832 A | 10/1975 | Tuck et al. |
| 5,192,026 A | 3/1993 | Rix |
| 5,351,398 A | 10/1994 | Haxell |
| 6,364,641 B2 | 4/2002 | Mori |
| 6,382,940 B1 | 5/2002 | Blume |

(Continued)

FOREIGN PATENT DOCUMENTS

DE 4111798 10/1991

(Continued)

OTHER PUBLICATIONS

Japan Office Action dated Aug. 26, 2011.

(Continued)

*Primary Examiner* — Nicholas A. Smith
(74) *Attorney, Agent, or Firm* — Thomas N. Twomey

(57) ABSTRACT

A method of manufacturing a metal housing (14) includes providing a first passage (10) through the metal housing (14) and providing a second passage (12) through the metal housing (14), wherein the second passage (12) includes a region of intersection (20) which intersects the first passage (10) to define an opening (22, 122, 222) into the first passage (10). The method further includes subjecting the metal housing (14) to a heat treatment process to carburise an internal surface of the first and/or second passage (10, 12) and, subsequent to the carburization process, applying a hard stage electrochemical machining process to the carburised internal surface of the first and/or second passage (10, 12) to improve surface finish. Another aspect of the invention includes providing a second passage (12) through the metal housing (14) by means of a tool (46), such as an electrochemical machining electrode, having an active region without rotational symmetry about its axis (Y-Y). The active region is shaped to provide the region of intersection (20) with a generally conical taper (29, 31) to the opening (22; 122; 222).

24 Claims, 6 Drawing Sheets

U.S. PATENT DOCUMENTS

| | | | |
|---|---|---|---|
| 7,419,553 B2 * | 9/2008 | Liedtke et al. | 148/319 |
| 2003/0010651 A1 * | 1/2003 | Zaitsev et al. | 205/645 |
| 2005/0133378 A1 * | 6/2005 | Glock et al. | 205/651 |

FOREIGN PATENT DOCUMENTS

| | | |
|---|---|---|
| EP | 0425236 | 5/1991 |
| EP | 0446165 | 9/1991 |
| EP | 0452798 | 10/1991 |
| EP | 0717227 | 6/1996 |
| GB | 2285096 | 6/1995 |
| JP | 52-148443 | 12/1977 |
| JP | 62017364 | 1/1987 |
| JP | 6-66223 | 3/1994 |
| JP | 6-123264 | 5/1994 |
| JP | 2001-248520 | 9/2001 |
| JP | 2005-48284 | 2/2005 |
| WO | 00/17513 | 3/2000 |

OTHER PUBLICATIONS

Japan Office Action dated Sep. 2, 2010.

Japan Office Action dated Jun. 13, 2012.

\* cited by examiner

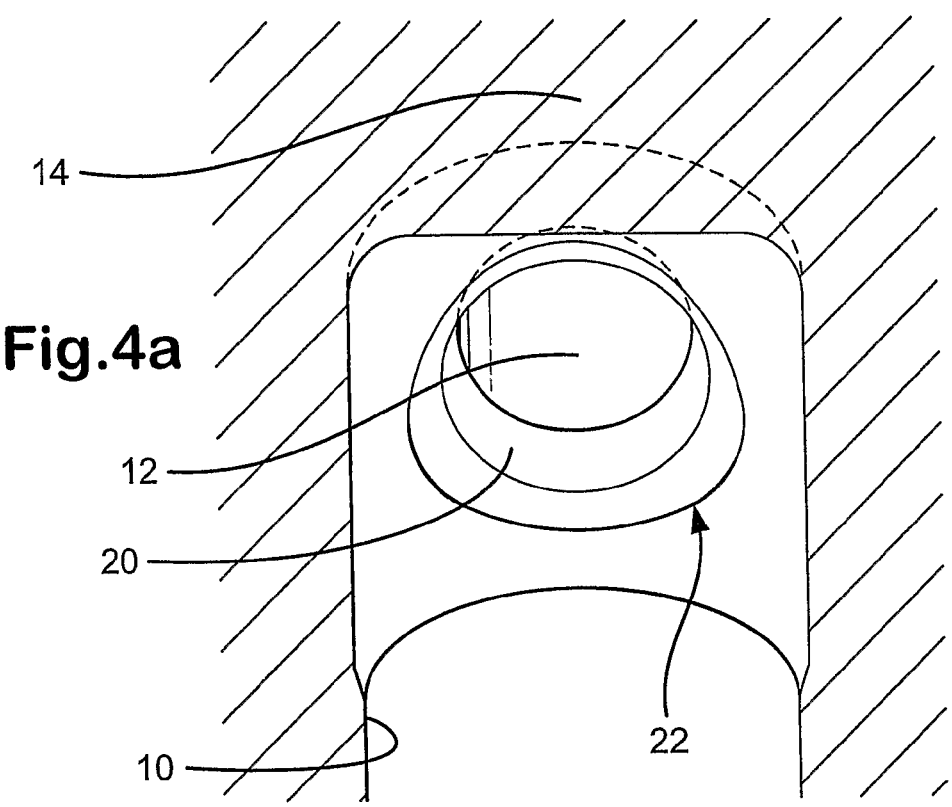
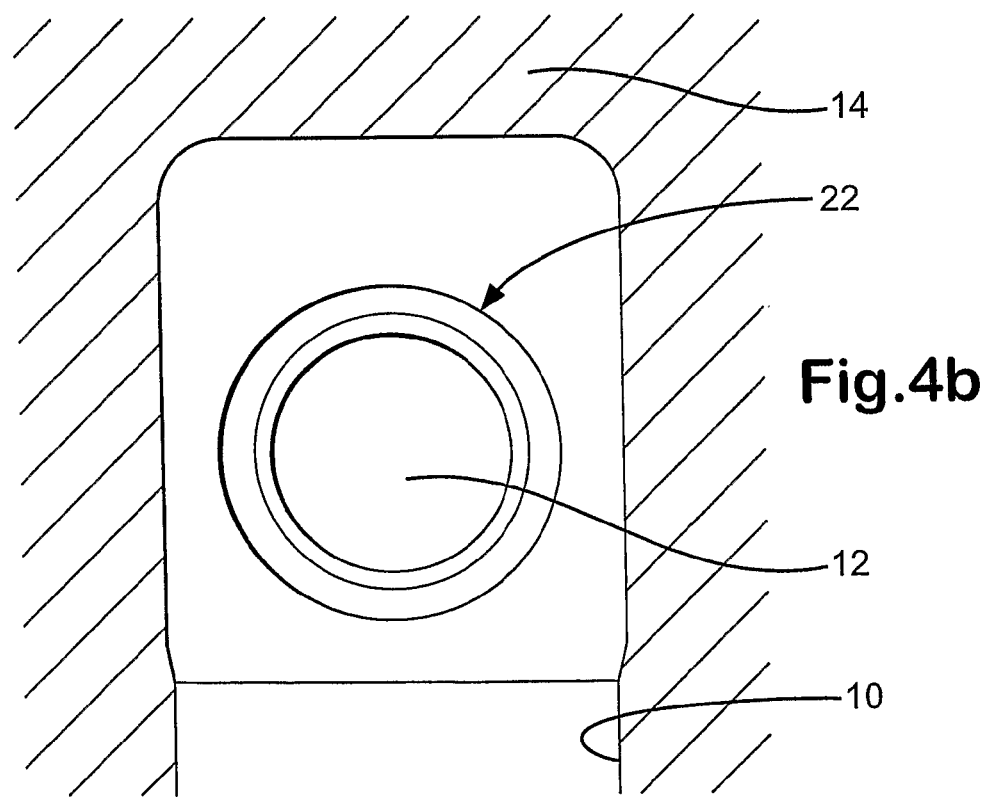

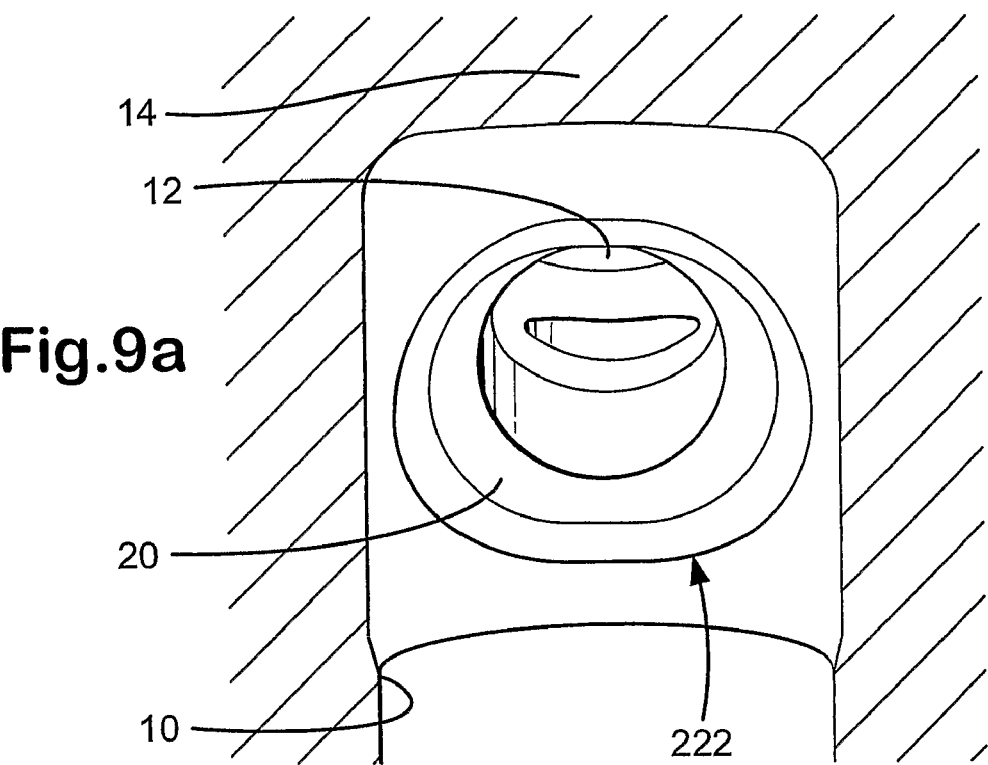
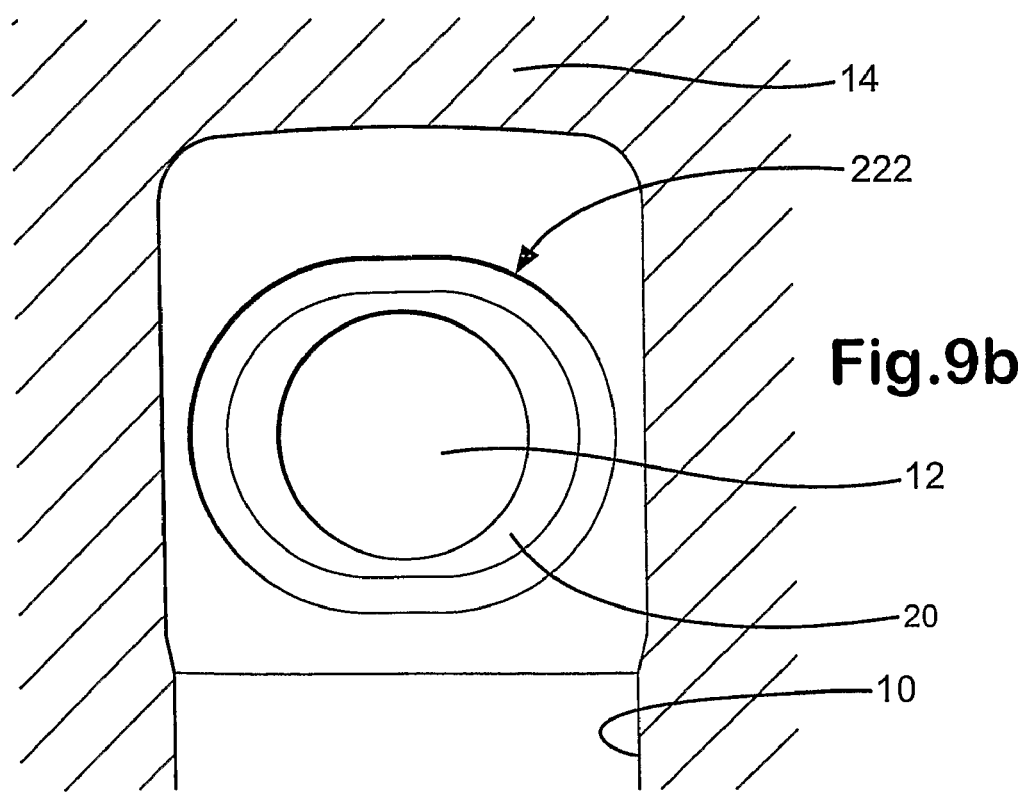

ly in fuel injection applications,
any residual abrasive particles can cause damage and/or seriously affect system performance.

MACHINING METHOD

CROSS REFERENCE TO RELATED APPLICATIONS

This application is a national stage application under 35 U.S.C. 371 of PCT Application No. PCT/GB2006/002102 having an international filing date of 6 Jun. 2006, which designated the United States, which PCT application claimed the benefit of Great Britain Application No. 0602742.9 filed 10 Feb. 2006 and European Patent Application No. 05253470.8 filed 6 Jun. 2005, the entire disclosure of each of which are hereby incorporated herein by reference.

TECHNICAL FIELD

The invention relates to a method of machining metal parts. In particular, but not exclusively, the invention relates to an electrochemical machining method which is suitable for use in the manufacture of metal parts for use in high pressure hydraulic applications. Another aspect of the invention relates to metal parts formed using such an electrochemical machining method.

BACKGROUND OF THE INVENTION

One of the problems encountered when using conventional drilling methods to form passages in metal parts is that stress concentrations arise at the intersection or transition between one drilled passage and another when the drillings are under internal pressure. In hydraulic applications, for example, where the drillings carry a flow of fluid, the presence of fluid within the drillings can generate high stress concentrations which lead to failure of parts. One application where this problem arises in particular is in fuel injection systems. In particular, the Applicant has noticed that the stresses arising in common rail fuel pumps can be especially high, where high pressure flow passages carry pressurised fuel to the downstream parts of the fuel injection system.

Electrochemical machining methods (ECM methods) have been used previously in high pressure fuel pump manufacture to reduce the aforementioned stress concentration problem by shaping the transition region between one drilling and another. This may be done by radiussuing the end of one drilling at the region at which it intersects the other.

The ECM process is based on a controlled anodic electrochemical dissolution of a metal part (the anode) with a preshaped tool (the cathode) during an electrolysis process. A direct current with high density and low voltage is passed between the metal part and the tool to dissolve the metal surface into metallic ions by a deplating reaction, with the result that the tool shape is copied into the metal part. An electrolyte is forced to flow through the interelectrode gap with high velocity to intensify the mass/charge transfer near the anode and to remove the sludge (dissolution products) generated in the gap. Conventional ECM methods are carried out on the metal when the material is in a pre-heat treated stage, commonly referred to as a "soft stage" of the material. Following ECM, the metal is carburised using a heat treatment process to harden the exposed surfaces.

For homogeneous materials, soft stage ECM processing provides a satisfactory surface finish for high pressure fluid applications. However, in materials with poor homogeneity, such as pearlitic forged materials, soft stage ECM processing gives rise to undesirable pitting effects which act as stress concentrations. Furthermore, the heat treatment process gives rise to surface imperfections having a crocodile skin appearance, leaving poorly attached metal grains at the exposed surface. These surface imperfections can lead to failure of parts, particularly in high pressure fluid applications. This problem in particular has been recognised during tests carried out by the Applicant on high pressure common rail fuel pumps.

It is also known to use an abrasive paste honing technique to polish the drilling intersections in high pressure pumps as a means of reducing stress concentrations. Abrasive paste honing makes use of an abrasive material to improve surface finish and can be a relatively messy and inconvenient process. One problem in particular can be the length of time for which the abrasive paste honing method must be applied. Furthermore, the technique does not always improve surface finish to the sufficiently high level required for very high pressure fuel pump applications. The abrasive paste is also difficult to clean off metal parts and, particular Although modern common rail fuel injection systems for diesel engines operate at relatively high pressures, there is a requirement for fuel pressures to be increased further to provide additional engine performance benefits. The drillings are formed in the main pump housing, or in a pump head attached to the main pump housing, and provide an outlet flow path for high pressure fuel which has been pressurised in a pump chamber. An example of the Applicant's common rail fuel pump is described in our co-pending European patent application EP 1489301. As engine technology develops there is a requirement to be able to inject fuel into the engine at increasingly high pressures. Thus, there are increasing demands on the high pressure pump capability, so that the conventional methods used to machine the drillings in these parts lack suitability.

It is one object of the present invention to provide a method of machining metal parts which overcomes the limitations of known techniques.

SUMMARY OF THE INVENTION

According to a first aspect of the invention, there is provided a method of manufacturing a metal housing including providing a first passage through the metal housing and providing a second passage through the metal housing by means of a tool having an active region which does not have rotational symmetry about its axis, wherein the second passage includes a region of intersection which intersects with the first passage to define an opening thereinto and wherein the region of intersection includes a generally conical taper. The generally conical taper of the region of intersection tapers outwardly towards the opening.

By way of example, the method may include providing the second passage by applying an electrochemical machining process to the internal surface of the second passage using an electrochemical machining electrode.

In particular, the method may include providing a tooling means in the form of an electrochemical machining electrode having a generally conical region and at least upper and lower flats formed thereon to provide a rotationally non-symmetric geometry about the electrode axis.

For example, the method may include machining the opening into the first passage so that it has a generally oval or generally elliptical outer periphery, or a generally square or generally rectangular outer periphery.

In a preferred embodiment, the method includes machining the opening with a major cross axis and a minor cross axis, wherein the minor cross axis is perpendicular to the major cross axis and wherein the major and minor cross axes lie in a plane perpendicular to the first passage. For example, the axes may define an aspect ratio for the opening within the range of 6:5 to 9:5, preferably 7:5 to 8:5 and, typically, of around 3:2.

According to a second aspect of the invention, there is provided a metal housing for use in high pressure fluid applications, the metal housing being provided with first and second passages which intersect at a non-circular opening defined by a region of intersection at one end of the second passage. The region of intersection includes a generally conical taper which preferably tapers outwardly towards the opening.

The metal housing is preferably formed by means of the method of the first aspect of the invention.

The outer periphery of the opening is preferably shaped to include a flat upper region and a flat lower region. For example, the outer periphery of the opening may be generally oval or generally elliptical, or generally rectangular or generally square.

In one embodiment, the opening is machined with a major cross axis and a minor cross axis, the minor cross axis being perpendicular to the major cross axis and the major and minor axes lie in a plane perpendicular to the first passage.

The second aspect of the invention finds particular benefit in high pressure fuel pump applications, so that the metal housing takes the form of a housing for a high pressure fuel pump for an internal combustion engine, the first passage defining a bore for receiving a plunger of the pump, in use, and the second passage defining a flow passage for high pressure fuel into and/or out of the bore.

According to a third aspect of the invention, there is provided a method of manufacturing a metal housing, including providing a first passage through the metal housing, providing a second passage through the metal housing, wherein the second passage includes a region of intersection which intersects the first passage and defines an opening into the first passage. The metal housing is subjected to a heat treatment process to carburise an internal surface of the first and/or second passage and, subsequent to the carburisation process, a hard stage electrochemical machining process is applied to the carburised internal surface of the first and/or second passage to improve surface finish.

Previously, ECM processes have been used on pre-heat treated (pre-carbursied) metal parts to form passages (often referred to as drillings) in metal parts. This process is referred to as "soft stage ECM". The present invention recognises that if the metal is carburised first, through heat treatment, and then machined using ECM there can be a noticeable improvement in the finish of the machined surface. Pitting is reduced or substantially eliminated and, thus, stress concentrations under high pressure are reduced. For the purpose of this specification, the method of machining a metal part following a carburising process will be referred to as "hard stage ECM".

The carburisation process preferably results in the internal surfaces of the first and second passages being carburised (i.e. hardened). In practice, through masking techniques it may be possible to carburise the internal surface of only one of the passages, although this is less desirable.

For hydraulic pump applications in common rail fuel systems, where the pressure of fuel in the pump is particularly high, the invention is found to have particular benefits as the improvement in surface finish has the effect of reducing stress concentrations in the region of intersection between the passages. Furthermore, because the metal part is carburised before the ECM process is applied, the electrochemical machining time is much reduced compared to soft stage ECM processes. This provides a further benefit for the manufacturing process.

In one embodiment, the method may include applying a soft stage ECM process to machine the first and second passages (i.e. to define their form) prior to carburisation, subsequently carburising the metal part on the internal surfaces of the passages and then applying a hard stage ECM process to polish the internal surfaces in the region of intersection. Typically, as an initial step in the method the first and second passages are drilled to define form, prior to the soft stage ECM process.

By applying a hard stage ECM process to the passage following an initial machining process (or other initial process by which the passage is formed), and following the optional initial soft stage ECM process, the region of intersection between the passages is polished effectively and, thus, stress concentrations are reduced.

In one embodiment, the soft stage electrochemical machining process includes machining the internal surface of the second passage using a soft stage electrode having a region of generally conical form which provides the region of intersection with a generally conical taper to the opening.

In one example, a soft stage electrode may be used which has an active region with a rotational symmetry about its axis, thereby to machine the opening with a generally circular outer periphery. By reference to an axis of the electrode, it is intended to mean the primary, long axis of the electrode.

In another example, a soft stage electrode may be used with an active region which does not have rotational symmetry about its axis. In this case, the soft stage electrode may be provided with a generally conical region with at least upper and lower flats formed thereon, so as to give the rotationally non-symmetric active electrode geometry about the electrode axis.

In one embodiment, the method includes providing a soft stage electrode which is shaped to machine the opening with a generally square or generally rectangular outer periphery, or with an generally oval or generally elliptical outer periphery.

For such embodiments it has been found that the machining of the opening into the first passage by means of an electrode with a rotationally non-symmetric geometry about its primary axis, for example so as to define an oval or elliptical geometry at the opening, provides a further stress concentration benefit, over and above that achieved by means of the surface finish improvement provided by the hard stage ECM process.

Preferably, the opening is machined with a major cross axis and a minor cross axis. The minor cross axis is perpendicular to the major cross axis and both axes lie in a plane perpendicular to the first passage. The axes typically define an aspect ratio for the opening of between 6:5 to 9:5, preferably 7:5 to 8:5 and, typically, for example, about 3:2.

In one particular embodiment, the hard stage electrochemical machining process includes machining the internal surface of the second passage by means of a hard stage electrode shaped to machine a further generally conical taper in the region of intersection, so that the further generally conical taper resulting from the hard stage electrode overlays, and is formed on top off, the region of generally conical taper that results from the soft stage machining process.

In another embodiment the hard stage electrochemical machining process includes machining the internal surface of the second passage by means of a hard stage electrode which is shaped to machine a radiussed edge at the opening into the first passage.

It may be convenient to provide at least one of the soft and hard stage electrodes with an insulation means, for example an insulating shield, sleeve or mask, so that only a part of the region of intersection is machined during the electrochemical machining process. In embodiments in which the electrode tooling means has a rotationally non-symmetric geometry about its primary axis to form the required profile for the opening, the insulation means may be shaped and configured to define the rotationally non-symmetric active region of the electrode, whereas the body of electrode itself may have a regular, symmetric shape.

Alternatively, it may be that the electrode itself has a rotationally non-symmetric geometry about its axis.

In one embodiment, the method may comprise receiving the soft stage electrode within the second passage to perform the soft stage electrochemical machining process, and subsequently receiving the hard stage electrode within the first passage to perform the hard stage electrochemical machining process.

Alternatively, the method may comprise receiving the soft stage electrode within the second passage to perform the soft stage electrochemical machining process, and subsequently receiving the hard stage electrode within the second passage to perform the hard stage electrochemical machining process.

If a soft stage ECM process is not used, the method may include one of the following: machining the internal surface of the second passage using a hard stage electrode which has a region of generally conical form to provide the region of intersection with a generally conical taper to the opening, or machining the internal surface of the second passage using a hard stage electrode which has a region of generally conical form to define a radiussed edge on the opening.

By way of example, the method may include providing a hard stage electrode having an active region with rotational symmetry about its axis, thereby to machine the opening to with a generally circular outer periphery (i.e. the outer periphery has a rotationally symmetric shape).

In another embodiment where no soft stage process is used, the method includes providing a hard stage electrode having an active region which does not have rotational symmetry about its axis. For example, the method may include providing a hard stage electrode having a generally conical region and at least upper and lower flats formed thereon to provide a hard stage electrode geometry without rotational symmetry about its axis.

For example, the method may include providing a hard stage electrode which is shaped to machine the opening with a generally square or generally rectangular outer periphery, or with an oval or elliptical outer periphery.

For example, the opening may be machined with a major cross axis and a minor cross axis, the minor cross axis being perpendicular to the major cross axis. The major and minor cross axes lie in a plane perpendicular to the first passage. The axes may define an aspect ratio for the opening within the range of 6:5 to 9:5, preferably 7:5 to 8:5 and, typically, of around 3:2.

In a particularly preferred embodiment, the method may include providing the first passage along a first axis of the metal housing, and providing the second passage along a second axis of the metal housing, wherein the first axis is perpendicular to the second axis.

The invention finds particular benefit when employed in the manufacture of a high pressure fuel pump for a fuel injection system. The metal housing may therefore take the form of a pump housing, either a main pump housing or a hydraulic pump head. The first passage may take the form of a plunger bore for receiving a pumping plunger, in use, the plunger bore defining a pump chamber within which fuel is pressurised as a result of plunger motion. The second passage may take the form of a flow passage through which flow flows to and/or from the pump chamber, in use. In another aspect of the invention, therefore, there is provided a metal housing as formed using the method of the third aspect of the invention.

It will be appreciated that the preferred and/or optional features of the third aspect of the invention may also be incorporated in the first aspect of the invention, or may be used to provide preferred and/or optional features of the second aspect of the invention also.

BRIEF DESCRIPTION OF THE DRAWINGS

The invention will now be described, by way of example only, with reference to the accompanying drawings in which:

FIG. 4 illustrates (a) a three dimensional angled view from the front and (b) a section view of the intersection between first and second drillings formed using the method described with reference to FIGS. 1 to 3, FIG. 9 illustrates (a) a three dimensional angled view from the front and (b) a section view of an oval intersection between first and second drillings formed in the pump housing part using a further embodiment of the present invention.

DETAILED DESCRIPTION OF THE PREFERRED EMBODIMENTS

Figure 1:
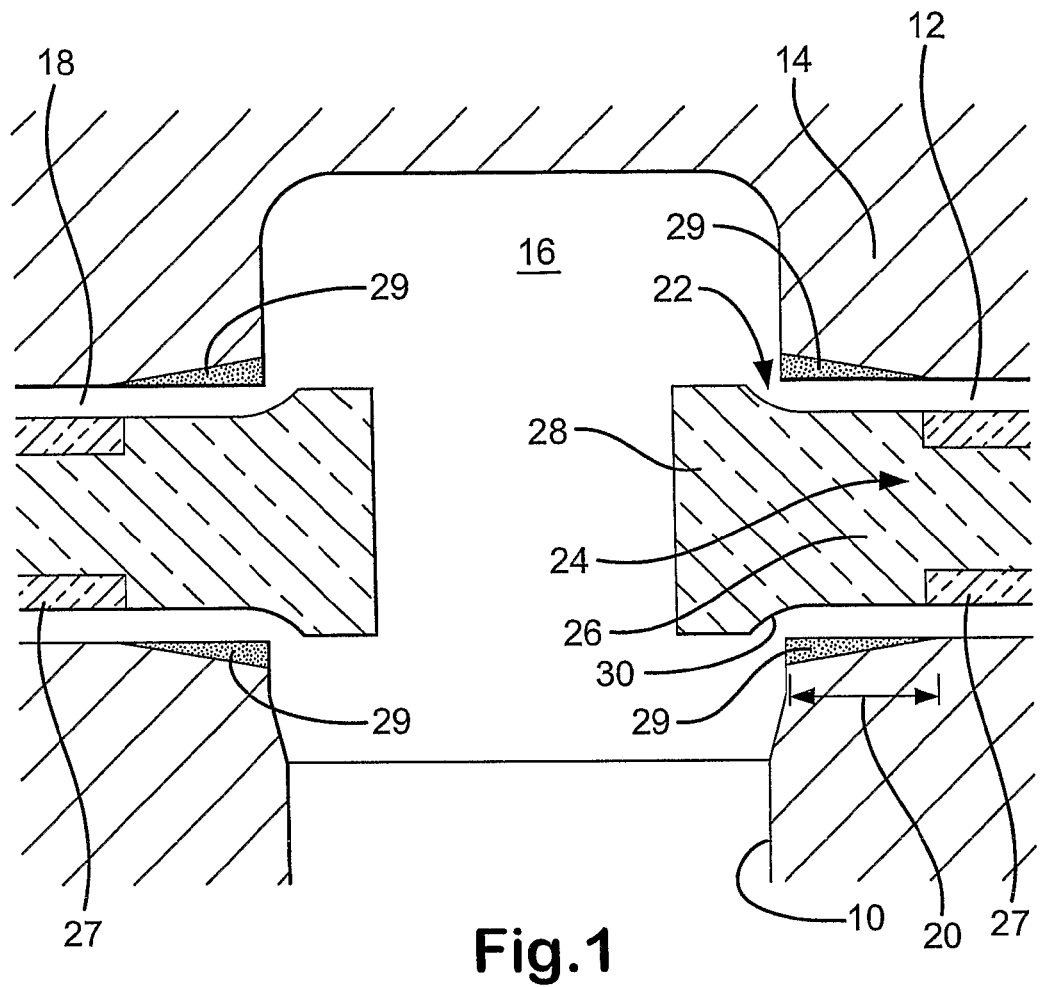
FIG. 1 is a section view of a pump housing part during an initial processing step of a first embodiment of the method of the present invention.

FIG. 1 shows an electrode arrangement for a soft stage ECM process to be applied at the intersection of first and second drillings, 10 and 12 respectively, provided in a metal housing part 14. The metal housing part 14 takes the form of a pump housing forming part of a common rail fuel pump for a compression ignition internal combustion (diesel) engine. The first drilling defines a plunger bore 10 which accommodates a pumping plunger (not shown), in use. The plunger bore 10 defines a pump chamber 16 at one end thereof within which fuel pressurisation takes place as the plunger is driven. The second drilling defines a flow passage 12 for fuel flowing out of the pump chamber 16 following pressurisation. The flow passage will hereinafter be referred to as the outlet passage 12.

An inlet passage is also provided in the pump housing 14 by means of a third drilling 18 through which fuel at relatively low pressure is supplied to the pump chamber 16. The machining method of the present invention may be applied to either the outlet passage 12 and/or the inlet passage 18, and preferably to both, but for the purpose of the following description only the machining of the intersection between the plunger bore 10 and the outlet passage 12 will be described in detail.

The pump housing 14 may take the form of a main pump housing through which a central drive shaft extends to drive the plunger, and the other plungers of the pump, when is use. Alternatively, the pump housing may take the form of a hydraulic pump head which is fixed to the main pump housing. An example of a common rail fuel pump of the latter type is described in our co-pending European patent application EP 1489301.

The plunger bore 10 extends along a first longitudinal axis and the outlet passage 12 extends along a second longitudinal axis extending substantially perpendicular to the plunger bore axis. The outlet passage 12 is of generally uniform diameter along its length, and defines a region of intersection, referred to generally as 20, which intersects the plunger bore 10 to define an enlarged diameter opening 22 in the plunger bore wall. The shape and surface finish of the region of intersection 20 will be described in further detail later.

Figure 2:
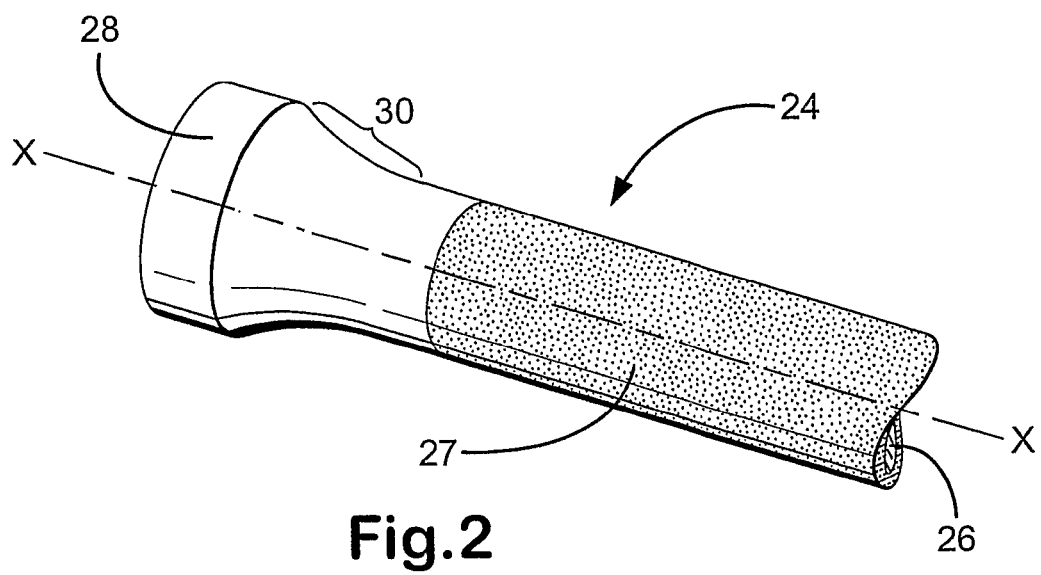
FIG. 2 is an enlarged perspective view of an ECM electrode used in the method of the first embodiment.

A method of a first embodiment of the invention will now be described. As an initial step, a conventional drilling or boring method is used to create the drilling for the plunger bore 10 and the drilling for the outlet passage 12. In practice, the plunger bore 10 and/or the drilling 12 may also be turned following the initial drilling process. In order to finish the region of intersection 20 between the drillings 10, 12, a tooling means including a first ECM electrode 24 (also shown in FIG. 2) is received coaxially within the outlet passage 12 to apply an initial, soft stage ECM process to the region of intersection 20. The first ECM electrode 24 includes an active region (i.e. that region of the tooling apparatus which has an active machining effect) with a rotational symmetry along its primary axis. In other words, the geometry of the electrode 24 is such that it could be produced by means of a lathe or other turning process. The primary axis of the electrode 24 is aligned with the axis of the outlet passage 12 and identified as X-X.

The first ECM electrode 24 includes a main electrode stem 26 having a substantially uniform diameter along its length and an enlarged diameter electrode head 28 that is spaced from the stem 26 by means of a conically tapered, or flared, mid-section 30. An electrode of this form, used for ECM purposes, will be referred to as an "ECM cone electrode". Part way along the length of the main electrode stem 26, the electrode is provided with an insulation means, in the form of an insulation sleeve 27, which prevents ECM machining of adjacent surface areas where machining is not necessary. In this embodiment, it is therefore the insulation means 27 that defines what is considered to be the active region of the electrode.

A voltage is applied to the ECM cone electrode 24 to generate a high current density at the surface of the housing 14. This has the effect of dissolving the internal surface of the outlet passage 12 in the region of intersection 20, whilst an electrolyte is flushed through the passages 10, 12 to carry the dissolution products away. As a result of this processing stage, the shape of the outlet passage 12 in the region of intersection takes up the approximate conical shaping of the first ECM electrode cone 24, so that the region of intersection 20 tapers outwardly towards the opening 22. The conical shaping in the region of intersection 20 is referred to as the first ECM cone and is identified in FIG. 1 by the shaded region 29. This process is referred to as 'ECM soft stage machining' because, at this stage, no heat treatment has been applied to the pump housing 14 to harden the exposed surfaces. It has been found that the aforementioned process of ECM machining the region of intersection 20 to produce a conical shaping 29 provides a particularly robust intersection profile that reduces the stress concentrations which may otherwise lead to failure problems.

Once the ECM soft stage process has been applied to the region of intersection 20 to form the first ECM cone 29, a heat treatment process in the form of a carburisation process is applied to the pump housing 14. The carburisation process is achieved by heating the pump housing 14 in a carbon rich atmosphere, such as carbon dioxide, methane, propane or acetylene, so that the carbon potential is sufficient to cause adsorption of carbon at the surface of the metal, thereby making the exposed surfaces harder. Thus, the internal surfaces of the plunger bore 10 and the outlet passage 12, including the region of intersection 20, are hardened by a carburised layer. Typically, the carburisation process results in a hardened layer having a thickness of around 1 mm.

A method of a second embodiment of the invention will now be described. In another embodiment of the invention, once the initial ECM machining process has been applied to the region of intersection 20 to form the first ECM cone 29, as described previously, and following carburisation of the pump housing 14, a second stage ECM process is applied to the region of intersection 20 between the plunger bore 10 and the outlet passage 12. This is referred to as the hard stage ECM process (i.e. post-carburisation).

Figure 3:
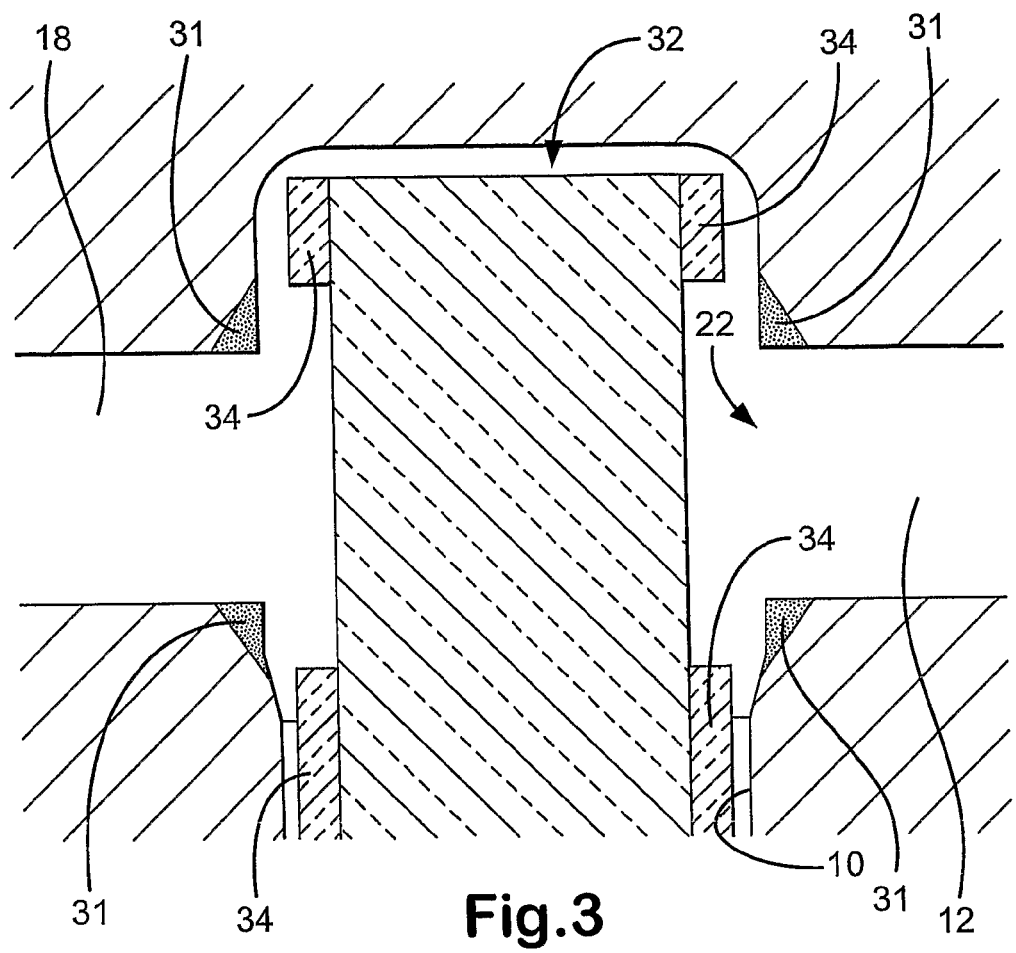
FIG. 3 is a section view of the pump housing part in FIG. 1 during a second processing step of the method of the first embodiment.

Referring to FIG. 3, hard stage ECM machining is achieved by means of a tooling means including a second ECM electrode 32 which extends coaxially with the plunger bore 10. Comparing the ECM soft and hard stages, the initial soft stage ECM process may be applied for around 50 seconds, whereas the second, hard stage ECM process need only be applied for a much shorter time, typically around 5 seconds. Overall, therefore, the processing time required to form and polish the drilling intersection using the two-stage ECM method is not significantly longer than that required when using a conventional soft stage ECM process only.

The second ECM electrode 32 is substantially cylindrical in form and is provided with an insulation means in the form of an insulation sleeve or mask, identified at 34, provided with first and second electrode apertures or windows (not identified). The second ECM electrode 32, together with its insulation sleeve 34, has an active electrode region with a rotational symmetry along its primary axis. The insulation sleeve 34 is shaped so as to restrict that region of the plunger bore 10 which is exposed during the hard stage ECM process so that only that region of the plunger bore 10 in the vicinity of the opening 22 is machined. The internal surface of the outlet passage 12 is also exposed to the hard stage ECM process in its region of intersection 20 with the plunger bore 10.

The windows in the insulation sleeve 34 are shaped to allow the plunger bore surface in the vicinity of the opening 22 of the outlet passage 12 to be machined during the ECM hard stage process, together with the plunger bore surface in the vicinity of the opening of the inlet passage 18. The insulation sleeve 34 therefore defines what may be considered to be the active region of the second ECM electrode 32.

The second ECM electrode 32 is activated by a current flow, as described previously, and an electrolyte solution is flushed through the passages 10, 12 to remove the dissolution products. The result of applying the hard stage ECM process is that the profile of the region of intersection 20 between the outlet passage 12 and the plunger bore 10 follows that of the unmasked region (i.e. the window profile) of the second ECM electrode 32. As a result, a second conical taper is applied to the region of intersection 20. The second region of conical taper is identified in FIG. 3 as region 31 and effectively overlays, and is formed on top of a part of, the first conical taper region 29, hence modifying the first conical taper region in the region of the opening 22.

Figure 5:
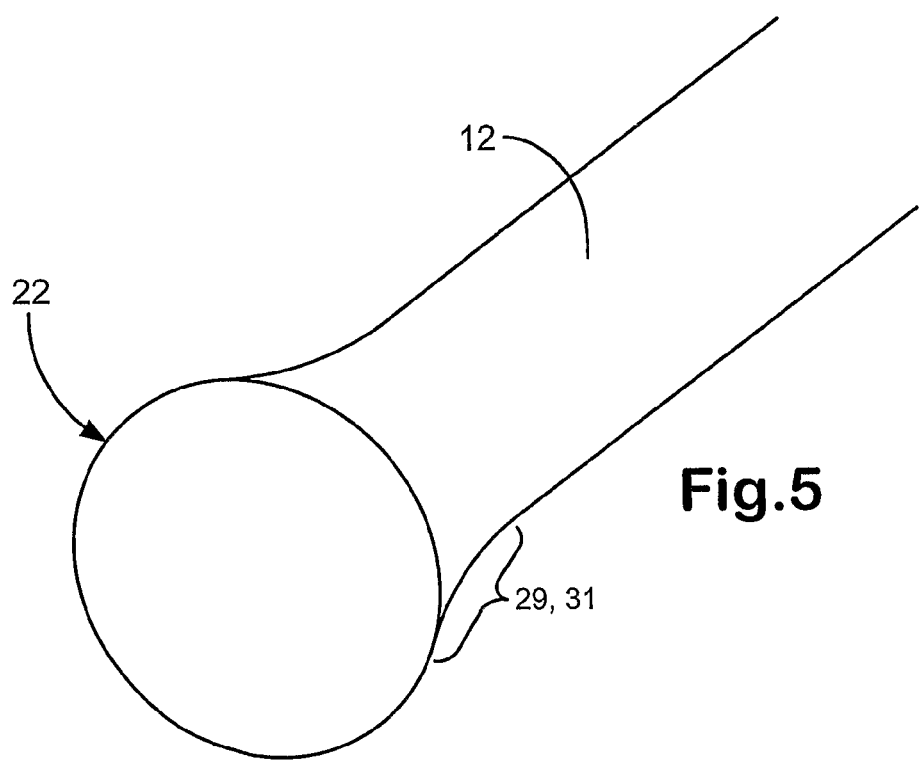
FIG. 5 is an enlarged perspective view of the second drilling in FIGS. 3 and 4.

To better understand the final form of the outlet passage 12 in the region of intersection 20 with the plunger bore 10, reference is made to FIGS. 4(a), 4(b) and 5. The outlet passage 12 is of substantially uniform diameter along its length, and includes a region of conical taper 29, 31 which defines, at its enlarged end, the opening 22 into the plunger bore 10. The opening 22 has a substantially circular outer periphery and effectively defines the base of the generally conical passage 12, with the conical taper and radiussing being determined by the active profiles of the ECM electrodes 24, 32. As mentioned previously, the region of intersection 20 of the outlet passage 12 takes the form of two conical formations 29, 31, one machined on top of the other, although in the scale shown in the drawings, and to the eye, the second conical formation 31 may appear as more of a radiussing effect at the transition edge between the first conical region 29 and the plunger bore 10.

Although the soft stage ECM process is known to provide an adequate surface finish for pump applications where fuel pressure levels are up to around 1800 bar, the small pitting effects which arise following soft stage ECM processing are removed in the aforedescribed method by means of the subsequent hard stage ECM process. Furthermore, the hard stage ECM process removes other surface imperfections which would otherwise remain after the carburisation process. The high quality of the surface finish provided by the two stage process has been found to enhance fatigue strength in high pressure pump applications so that very high fuel pressure levels can be achieved without suffering failures. Typically, for example, the soft stage ECM process results in a fairly good surface finish (excluding pitting), whereas following the hard stage ECM process a much improved surface finish (typically a factor 3 improvement) is achieved.

In a modification to this embodiment, the shape of the insulation sleeve 34 may be modified so that it is not a second conical taper 31 that overlays the first conical taper 29, but another taper profile.

In a modification to the hard stage ECM method described previously, the insulation sleeve 34 for the second ECM electrode 32 may be removed so that the entire internal surface of the plunger bore 10 is machined under the hard stage ECM process. This has an effect on the shaping of the region of intersection whereby the machining effect of the second ECM electrode 32 is more of a radiussing effect on the first conical region 29, rather than being a distinctive second cone formation. In another modification, the first ECM electrode 24 may take the form of a cylindrical electrode (as opposed to the electrode design of FIG. 2). The cylindrical electrode has an appropriate insulation means which is shaped to generate the shape of the first conical region 29.

The processes described previously may be carried out for the inlet passage 18 also using an identical ECM electrode arrangement to that described previously for the outlet passage 12. For the ECM soft stage machining process, the first ECM electrode 24 is therefore applied coaxially within the inlet passage 18 to machine a first conical region (such as 29) at the region of intersection 20 with the plunger bore 10. For ECM soft stage machining combined with ECM hard stage machining, the first ECM electrode 24 is applied coaxially within the inlet passage 18 to machine a first conical region (such as 29) at the region of intersection 20 with the plunger bore 10, and then the second ECM electrode 32 is applied, with appropriate insulation means, coaxially with the plunger bore 10 to machine a second conical region (such as 31) in the region of intersection 20.

In another embodiment of the invention the initial soft stage ECM process is applied as described previously (as illustrated in FIG. 1), but is now followed by a second hard stage ECM process (not illustrated) in which the second, hard stage ECM electrode has the same form as that of the initial, soft stage ECM electrode but is applied along the same axis as the initial soft stage electrode (i.e. through the outlet passage 12), rather than through the plunger bore 10.

Figure 6:
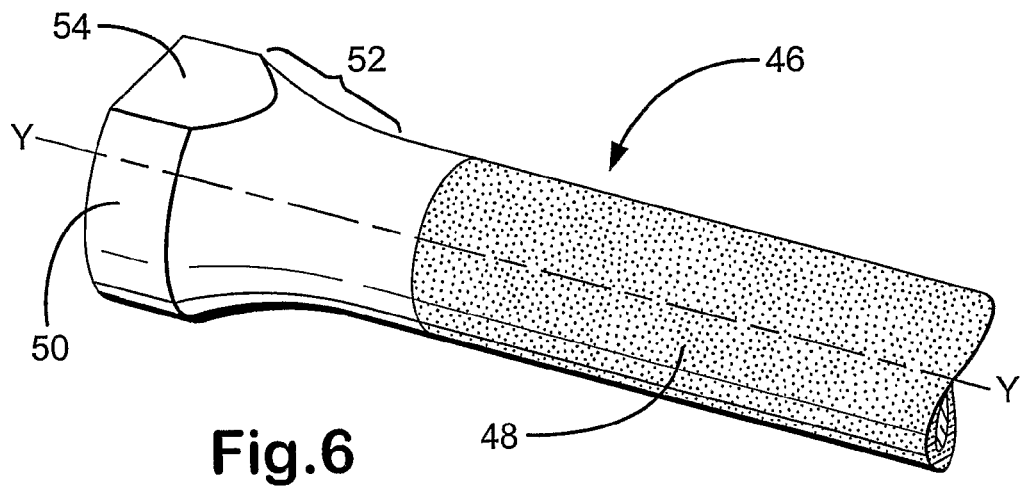
FIG. 6 is a perspective view of an ECM electrode for use in the first and second processing stages of an alternative method of the invention.

In another aspect of the invention, the ECM method may be used to create a geometry at the region of intersection 20 which does not define a regular circular opening into the plunger bore 10, but which instead defines a rotationally non-symmetric geometry along the axis of the outlet passage 12. Referring to FIG. 6, the ECM electrode 46 is similar to that shown in FIG. 2 in that it includes a main electrode stem 48 having a substantially uniform diameter along its length and an enlarged electrode head 50 that is spaced from the stem 48 by means of a conically tapered, or flared, electrode midsection 52. However, the ECM electrode 46 is modified so as to remove the rotational symmetry about its primary axis, Y-Y, by including upper and lower flats 54 (only the upper one of which is visible in FIG. 6) which extend over the electrode head 50 and part way along the length of the mid-section 52. In other words, the active region of the electrode 46 is without rotational symmetry about its axis Y-Y.

Figure 8:
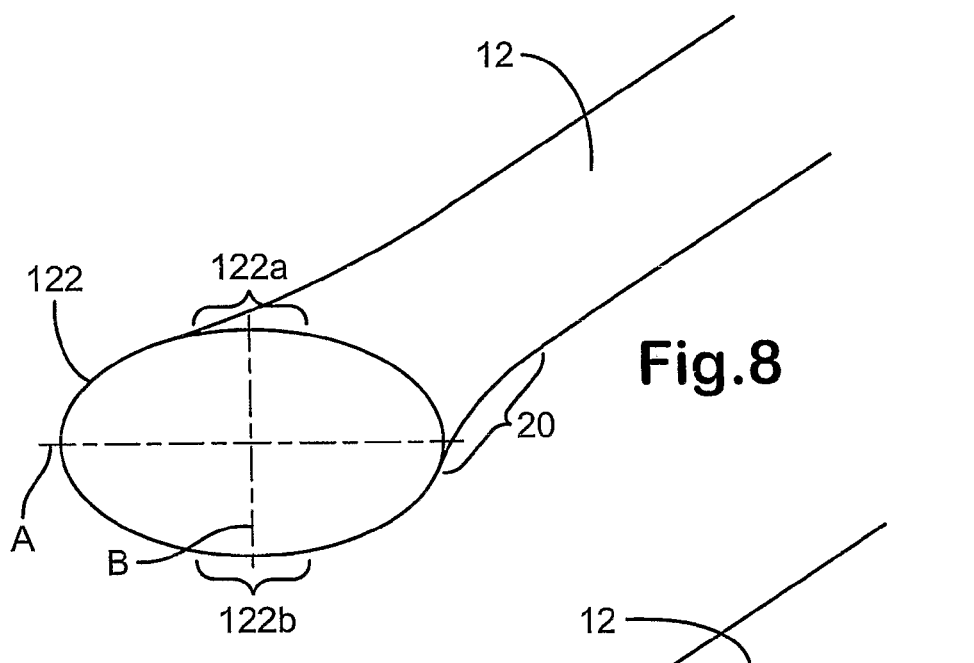
FIG. 8 is a perspective view of the second drilling in FIG. 7.
Figure 7A:
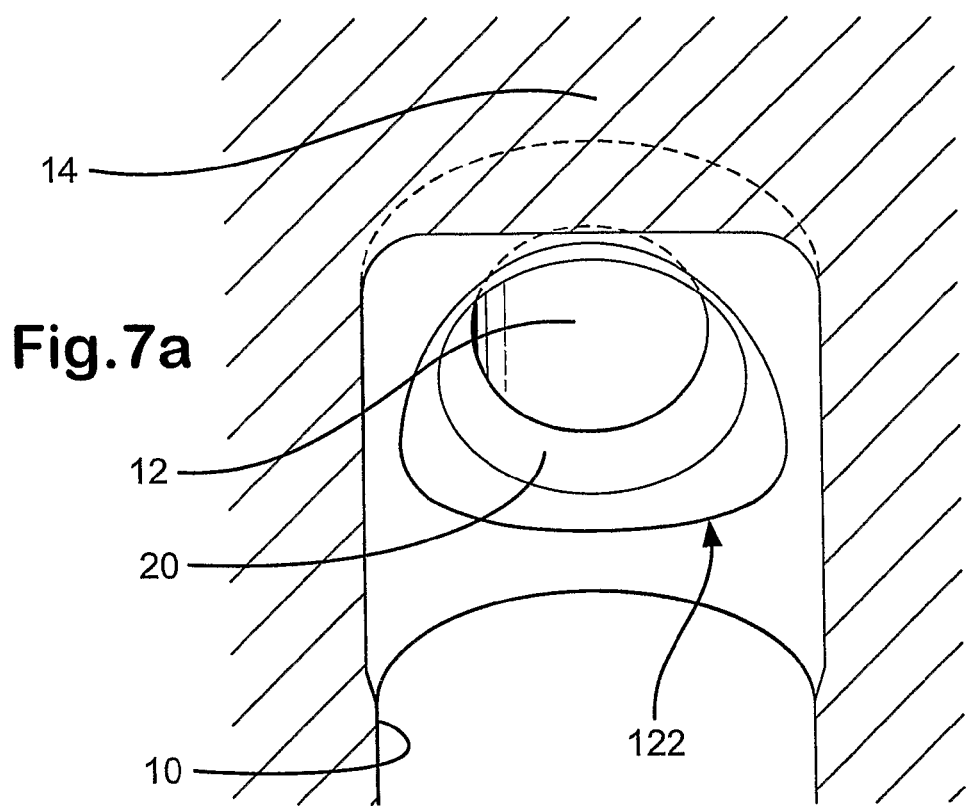
FIG. 7 illustrates (a) a three dimensional angled view from the front and (b) a section view of an elliptical intersection between first and second drillings formed in the pump housing part using the electrode of FIG. 6.
Figure 7B:
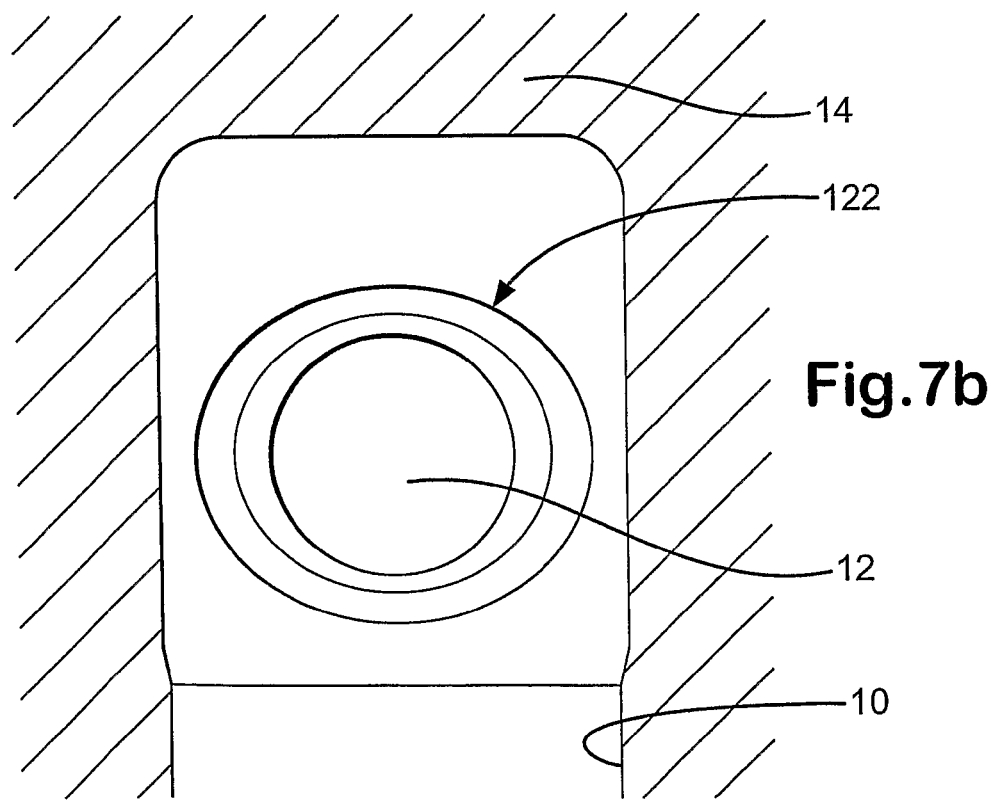

As shown in FIGS. 7 and 8, using the ECM electrode 46 in FIG. 6 the outlet passage 12 defines an opening 122 in the wall of the plunger bore 10 which does not define a regular circular periphery (as in FIG. 4), but instead has a periphery that is elliptical in shape. The profile of the outlet passage 12 in the region of intersection 20 tends to follow that of the profile of the ECM electrode 46 and its flats 54 (although not geometrically identical, there is a similarity between the profiles). As best seen in FIG. 8, the result of using the modified ECM electrode geometry in FIG. 6 is an elongation of the diameter of the opening 122 along a first axis A (the major cross axis), which is perpendicular to the axis of the outlet passage 12, and a shortening of the diameter of the opening 122 along a second axis B (the minor cross axis,) which is orthogonal to the first axis A (the minor and major cross axes A, B lie in a plane perpendicular to the plunger bore 10). Thus, the region of intersection 20 between the outlet passage 12 and the plunger bore 10 defines an opening 122 with almost non-existent curvature at the upper and lower edges of the opening 122 (i.e. the opening includes upper and lower flattened regions 122a, 122b). This elliptical shape differs from the conventional circular-base cone geometry of FIGS. 4 and 5.

The machining of the opening 122 into the plunger bore 10 by means of a tool (i.e. the ECM electrode) which does not have rotational symmetry about its axis has been observed to provide a further stress concentration benefit, over and above the stress concentration benefit provided by the previously described method of using a soft stage rotationally symmetric ECM electrode to produce a conical taper in the region of intersection 20. Furthermore, the result of using this method in combination with a hard stage ECM process provides considerable advantages for the intersection shape and finish.

In an alternative embodiment to the method described previously, it may be that the geometry of the electrode itself is rotationally symmetric about its axis and the insulation means is shaped to provide the tool with the required rotational asymmetry.

Figure 10:
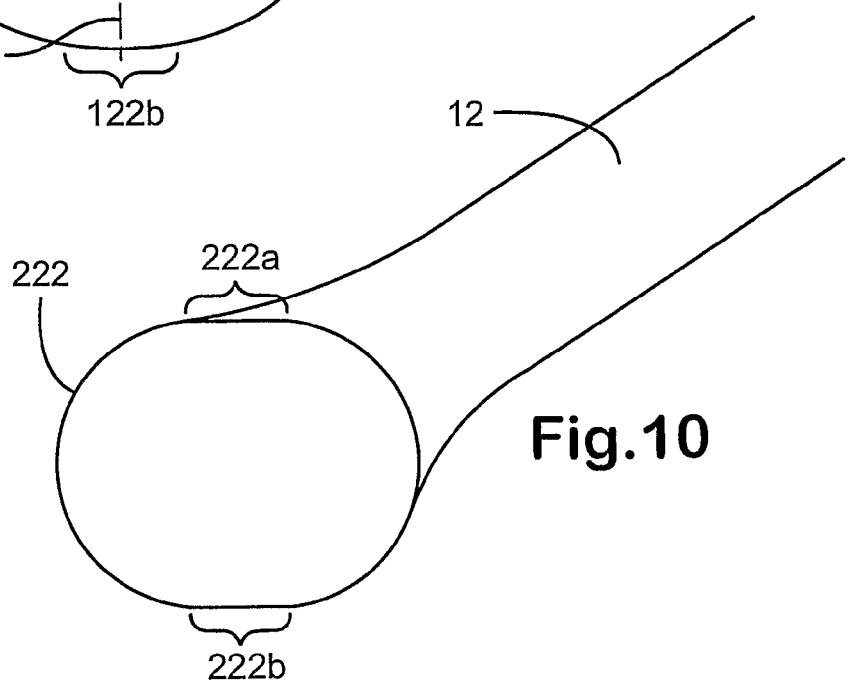
FIG. 10 is a perspective view of the second drilling in FIG. 9.

As shown in FIGS. 9 and 10, by means of an appropriate modification to the electrode geometry shown in FIG. 6, the opening 222 of the outlet passage 12 into the plunger bore 10 may be machined to be of generally oval form. Again, this requires the ECM electrode to be modified from the conventional rotationally symmetric form by providing flats along the upper and lower edges. The diameter of the opening 222 along the major axis A is elongated and the diameter of the opening 222 along the minor axis B is shortened. Again, as illustrated in FIG. 8, the curvature at the upper and lower edges 222a, 222b of the opening 222 is non-existent so that the upper and lower edges 222a, 222b are substantially flat. By forming the opening 222 in the region of intersection 20 to have a generally oval shape, a similar stress concentration reduction benefit is achieved as for an elliptical geometry.

For the avoidance of doubt, it is noted that in conventional fuel pumps there is a small degree of ellipticity in the opening of the outlet passage into the plunger bore, which derives from the conventional ECM soft stage process, despite the fact that the ECM has a rotational symmetry along its primary axis. For the purpose of the specification, however, reference to the invention defining an opening into a first drilling 10 at the intersection with a second drilling 12 with a degree of ellipticity shall be taken to mean that a deliberate ellipticity is provided at the intersection by means of an electrode tool which does not have a conventional rotational symmetry along its axis. This may be a tool which is shielded (insulated) so that the active region does not have rotational symmetry along its axis, or alternatively the main body of the tool itself may have the desired asymmetry (e.g. a flat blade-like electrode shape).

By way of further explanation, using conventional ECM processes, the ratio between the major and minor axes A, B of the opening 22 (referred to as the aspect ratio) is typically of the order of 11:10. In the present embodiment, the electrode geometry is selected so as to give an aspect ratio in the range of between 6:5 and 9:5, for example around 3:2. The invention therefore provides a clear and measurable distinction over the 'accidental' ellipticity which is observed when a conventional soft stage ECM process is applied to the region of intersection 20. In practice, the geometry of the tooling will be selected to give an aspect ratio in accordance with the minimum possible curvature at the upper and lower edges of the opening within the space constraints of the housing.

Other modifications to the electrode geometry to create alternative exotic shapes in the region of intersection provide similar stress concentration benefits for high pressure hydraulic applications. For example, substantially square-like or rectangular-like openings may also be employed having rounded corners. For the purpose of this specification, reference to generally square or generally rectangular shall be taken to mean that the openings are of this general shape, albeit with rounded-off corners. The rounding of the corners ensures no stress concentration problem arises at the corners.

In another embodiment, only a soft stage ECM process may be used with an electrode which does not have a rotational symmetry about its primary axis. No hard stage ECM process is applied. Although this does not provide the additional surface finish benefit achieved through the use of an additional hard stage process, it has been found that for certain pump designs a single stage (soft stage) ECM process in itself provides an adequate stress concentration benefit through the use of an exotic shaping at the intersection.

By way of example, the method may involve performing a soft stage ECM process with a modified electrode geometry, such as that shown in FIG. 6, to define an opening 122, 222 into the plunger bore 10 which is non-circular, for example elliptical, oval, generally square or generally rectangular, and defines flattened regions at the upper and lower edges of the opening periphery. Defining exotic shapes for the opening between the two drillings 10, 12 in the pump hydraulic head (or main pump housing) using ECM soft stage processing has not been proposed previously.

In a further modification to the methods described previously, the soft stage ECM process may be eliminated altogether so that only a hard stage ECM process is applied to the drillings after the initial drilling and carburisation processes have taken place. Whilst this may result in a slight loss of form, nonetheless it provides a good surface finish as a result of the hard stage ECM process. For example, it is known in the prior art to use a soft stage ECM process (cylinder electrode) followed by an abrasive paste honing process to improve the surface finish of the ECM machined parts. The use of only a hard stage ECM process provides a good alternative to the combined soft stage ECM and abrasive paste honing method. The hard stage ECM process produces surface finish benefits over a considerably shorter timescale compared to soft stage ECM and/or abrasive paste honing methods, and so can be used to reduce processing time without compromising the surface finish. It also avoids the need for abrasive paste honing altogether, which can be inconvenient, messy and time-costly.

One example of a method involving only a hard stage ECM process involves a modification of the method described with reference to FIGS. 1 to 5. Once the initial drillings 10, 12 have been formed in the pump housing 14 and the metal has been carburised, the first ECM electrode 24 is used to form the first region of conical taper 29 in the region of intersection 20 and the second ECM electrode 32 is used subsequently to form the second region of conical taper 31 in the region of intersection 20 (i.e. as shown in FIG. 3). In other words, two hard stage ECM processes are applied to create the final surface finish.

In a further alternative implementation, the second hard stage ECM process may be used to provide a radiussed edge on the first conical taper 29, rather than to provide a second cone.

In another example of using hard stage ECM processing, only one of the hard stage ECM processes may be required so that only a single electrode is used to produce the final surface finish. Although the surface finish will be less refined if only a single stage ECM process is used (i.e. only one conical taper is formed), for certain applications the stress concentration benefit may nonetheless be satisfactory. By way of example, in a modification of the method described with reference to FIGS. 6 to 10, the soft stage ECM process may be eliminated so that only a hard stage ECM process is used to create the exotic geometry shaping at the region of intersection 20 between the drillings 10, 12, for example using a single hard stage electrode having the form shown in FIG. 6.

Although the creation of the exotic shaping in the region of intersection between the drillings has been described in relation to an ECM method (hard stage, or soft stage, or both), the advantageous effects of providing this geometry are also realised if alternative machining and/or drilling methods are employed. For example, a simple drilling process which involves the use of a drilling tool having a rotationally non-symmetric geometry will also provide a stress concentration benefit for some applications.

Although the various aspects of the invention have been described in terms of a high pressure fuel pump, it will be appreciated that the invention is equally applicable to other parts of a fuel injection system where there is a requirement to transport high pressure fuel. For example, the method may be applied to the intersections between passages in a fuel injector, or in other passages of the common rail fuel supply system. In a fuel injector, for example, the passages are typically formed by laser machining, and not by drilling. The laser machined passages can then be formed and or finished using the various embodiments of the invention described previously.

Moreover, the invention is not limited to use in fuel injection systems and is also suitable for machining metal parts for other applications, whether hydraulic applications or otherwise. The passages 10, 12 formed in the parts may be formed using conventional drilling techniques, contact CNC milling, stationary EDM (electrodischarge machining), moving EDM or laser machining techniques, and references to passages as 'drillings' shall be taken to include passages that are formed by any of these processes or similar means. In addition, reference to ECM processing shall be taken to include stationary ECM and moving ECM (where the electrode is moved).

The invention claimed is:

1. A method of manufacturing a metal housing, the method including:
    providing a first passage through the metal housing,
    providing a second passage through the metal housing, the second passage including a region of intersection which intersects the first passage and defines an opening into the first passage,
    subjecting the metal housing to a heat treatment process to carburise an internal surface of the first and second passages,
    and subsequent to the carburisation process, applying a hard stage electrochemical machining process to the carburised internal surface of the first and/or second passage to improve surface finish.

2. The method as claimed in claim 1, further comprising applying a soft stage electrochemical machining process to the internal surface of the first and/or second passage prior to carburisation.

3. The method as claimed in claim 2, wherein the soft stage electrochemical machining process includes; machining the internal surface of the second passage using a soft stage electrode including a region of generally conical form, so as to form the region of intersection with a generally conical taper.

4. The method as claimed in claim 3, including providing a soft stage electrode having an active electrode region with rotational symmetry about its axis, so as to machine the opening with a generally circular outer periphery.

5. The method as claimed in claim 4, wherein the active electrode region is defined by an insulation means carried by the soft stage electrode.

6. The method as claimed in claim 3, including providing a soft stage electrode having an active electrode region without rotational symmetry about its axis.

7. The method as claimed in claim 6, including providing a soft stage electrode having a generally conical region and at least upper and lower flats formed thereon to provide a rotationally non-symmetric electrode geometry.

8. The method as claimed in claim 6 or claim 7, including providing a soft stage electrode which is shaped to machine the opening with one of the following: a generally square, a generally rectangular, an oval or an elliptical outer periphery.

9. The method as claimed in claim 6, wherein the opening is machined with a major cross axis and a minor cross axis, the minor cross axis being perpendicular to the major cross axis and the major and minor axes being in a plane perpendicular to the first passage.

10. The method as claimed in claim 3, wherein the hard stage electrochemical machining process includes: machining the internal surface of the second passage by means of a hard stage electrode shaped to machine a further generally conical taper in the region of intersection, so that the further generally conical taper resulting from the hard stage electrode overlays the generally conical taper resulting from the soft stage electrode.

11. The method as claimed in claim 3, wherein the hard stage electrochemical machining process includes: machining the internal surface of the second passage by means of a hard stage electrode shaped to machine a radiussed edge at the opening into the first passage.

12. The method as claimed in claim 3, comprising: receiving the soft stage electrode within the second passage to perform the soft stage electrochemical machining process, and subsequently receiving the hard stage electrode within the first passage to perform the hard stage electrochemical machining process.

13. The method as claimed in claim 3, comprising: receiving the soft stage electrode within the second passage to perform the soft stage electrochemical machining process, and subsequently receiving the hard stage electrode within the second passage to perform the hard stage electrochemical machining process.

14. The method as claimed in claim 1, including: machining the internal surface of the second passage using a hard stage electrode including a region of generally conical form so as to form the region of intersection with a generally conical taper.

15. The method as claimed in claim 1, including: machining the internal surface of the second passage using a hard stage electrode including a region; of generally conical form, thereby to define a radiussed edge on the opening.

16. The method as claimed in claim 14 or claim 15, including providing a hard stage electrode having an active electrode region with a rotational symmetry about its axis, so as to machine the opening with a generally circular outer periphery.

17. The method as claimed in claim 14 or claim 15, including providing a hard stage electrode having an active electrode region without rotational symmetry about its axis.

18. The method as claimed in claim 17, including providing a hard stage electrode having a generally conical region and at least upper and lower flats formed thereon to provide a rotationally non-symmetric electrode geometry.

19. The method as claimed in claim 17, including providing a hard stage electrode which is shaped to machine the opening with one of the following: a generally square, a generally rectangular, an oval or an elliptical outer periphery.

20. The method as claimed in claim 17, wherein the opening is machined with a major cross axis and a minor cross axis, the minor cross axis being perpendicular to the major cross axis and the major and minor cross axes lying in a plane perpendicular to the first passage.

21. The method as claimed in claim 17, wherein the active electrode region is defined by an insulation means carried by the hard stage electrode.

22. The method as claimed in claim 1, including: providing the first passage along a first axis of the metal housing, and providing the second passage along a second axis of the metal housing, wherein the first axis is perpendicular to the second axis.

23. The method as claimed in claim 1 when applied to a metal housing in the form of a fuel pump housing or a housing for a fuel injection system component.

24. The method as claimed in claim 23, wherein the first passage is a plunger bore for receiving a pumping plunger in use, the plunger bore defining a pump chamber within which fuel is pressurised as a result of plunger motion, and wherein the second passage is a flow passage through which flow flows to and/or from the pump chamber.

* * * * *